United States Patent [19]
Takeda

[11] Patent Number: 6,037,980
[45] Date of Patent: *Mar. 14, 2000

[54] ELECTRONIC CAMERA APPARATUS WITH FACILITY FOR VARYING SIZE OR POSITION OF A FOCUS DETECTING FRAME IN FOCUS CONTROL

[75] Inventor: Nobuhiro Takeda, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/706,746

[22] Filed: Sep. 6, 1996

Related U.S. Application Data

[62] Division of application No. 08/490,312, Jun. 14, 1995, Pat. No. 5,565,917, which is a continuation of application No. 07/950,444, Sep. 22, 1992, abandoned.

[30] Foreign Application Priority Data

Sep. 24, 1991 [JP] Japan .................................. 3-243498

[51] Int. Cl.[7] .................................................. H04N 5/232
[52] U.S. Cl. ........................................ 348/354; 348/349
[58] Field of Search .................................. 348/345, 349, 348/350, 354, 355, 346, 353, 252; 382/199; H04N 5/232

[56] References Cited

U.S. PATENT DOCUMENTS

| | | | |
|---|---|---|---|
| 4,969,045 | 11/1990 | Haruki et al. | 348/349 |
| 5,128,768 | 7/1992 | Suda et al. | 348/352 |
| 5,565,917 | 10/1996 | Takeda | 348/354 |
| 5,629,735 | 5/1997 | Kaneda et al. | 348/350 |

*Primary Examiner*—Tuan Ho
*Attorney, Agent, or Firm*—Robin, Blecker & Daley

[57] ABSTRACT

Each time an area of a distance measurement frame is changed at a position near the center of the lens focused position of a lens unit between the infinite range and the shortest range, a value of a high frequency component which is independent on a contrast is calculated by a system control circuit by a high frequency component in the distance measurement frame which is obtained from a high-pass filter and a luminance component which is obtained from an integrator. The calculated value is compared with a reference value by the system control circuit. When the calculated value is equal to or smaller than the reference value as a result of the comparison, the distance measurement frame is enlarged at a predetermined ratio by the system control circuit. On the other hand, when the calculated value exceeds the reference value, a signal is supplied to a lens driving motor from the system control circuit in accordance with an ES value which is obtained through an ES filter from the inside of the distance measurement frame and the lens unit is moved by the lens driving motor, thereby executing a focus adjustment.

9 Claims, 11 Drawing Sheets

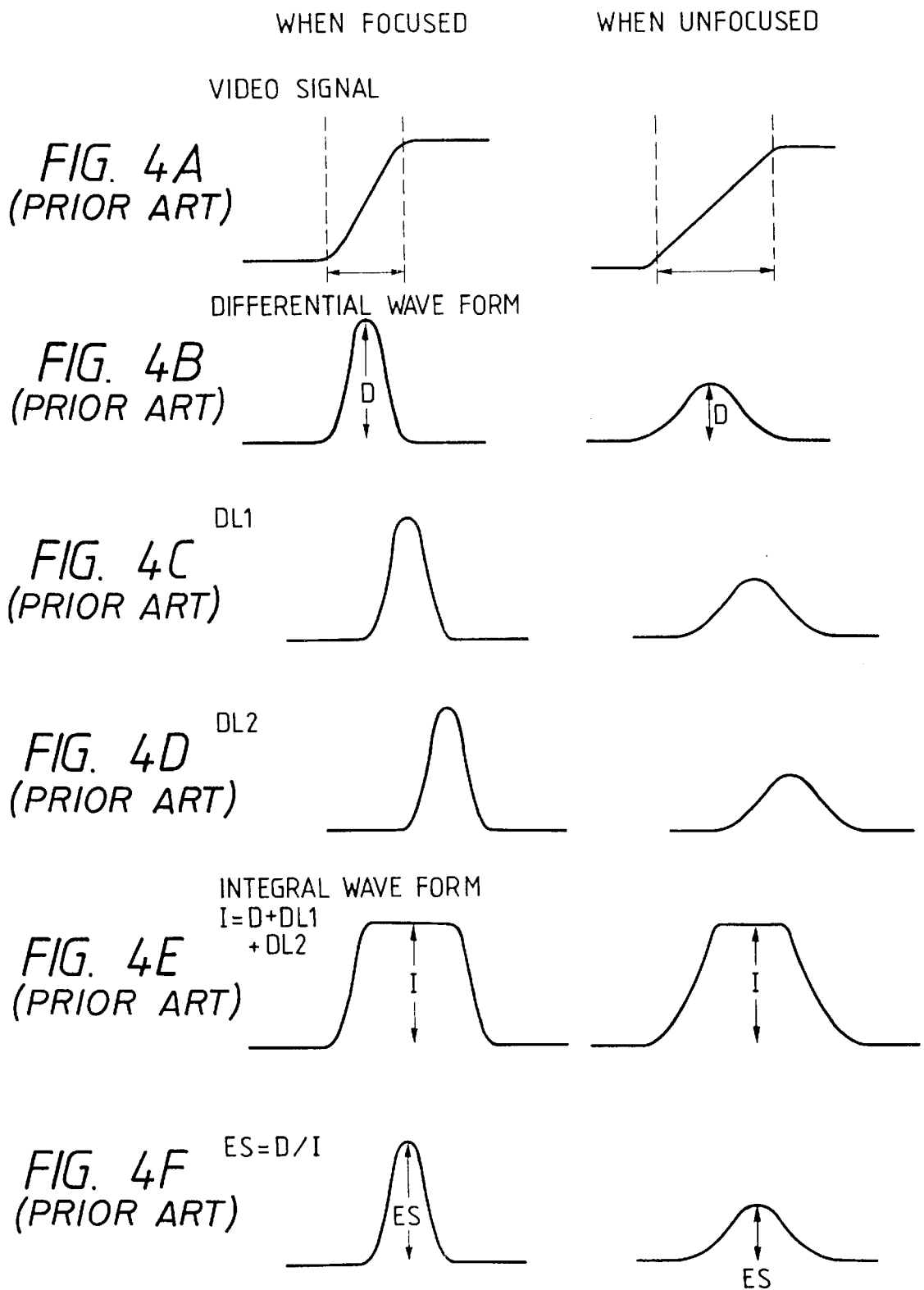

DISTANCE MEASUREMENT FRAME

DISTANCE MEASUREMENT FRAME

ELECTRONIC CAMERA APPARATUS WITH FACILITY FOR VARYING SIZE OR POSITION OF A FOCUS DETECTING FRAME IN FOCUS CONTROL

This is a division of application Ser. No. 08/490,312, filed Jun. 14, 1995, U.S. Pat. No. 5,565,917 which is a continuation of Ser. No. 07/950,444, filed Sep. 22, 1992, abandoned.

BACKGROUND OF THE INVENTION

1. Field of the Invention

The invention relates to an electronic camera having an automatic focus adjusting apparatus.

2. Related Background Art

Almost all of the recent cameras have the automatic focus adjusting function irrespective of the types of the cameras.

FIG. 1 is a block diagram showing a construction of such a kind of electronic camera.

In FIG. 1, reference numeral 1 denotes a lens unit; 2 a lens driving motor; 3 an iris; 4 an iris driving circuit; 5 a solid-state image pickup element such as a CCD or the like for converting an object image into an electric signal; 6 a solid-state image pickup element driving circuit to drive the solid-state image pickup element; 7 an A/D conversion circuit for A/D converting an image pickup signal generated from the image pickup element 5 into a digital signal; 8 a memory to store an output digital signal of the A/D conversion circuit 7; 9 an ES filter to calculate an ES value (which will be explained hereinlater) indicative of a blur amount from the image pickup signal stored in the memory 8; 10 a system control circuit to control the whole system of the electronic still camera; 11 an image pickup signal processing circuit for executing processes such as gamma (γ) conversion, band limitation, and the like to the output of the memory 8; 12 a D/A conversion circuit to D/A convert a digital output signal of the image pickup signal processing circuit 11 into an analog signal; 13 a frequency modulation circuit to frequency modulate an output of the D/A conversion circuit 12; 14 a recording amplifier to amplify an output current of the frequency modulation circuit 13; 15 a magnetic head; 16 a magnetic sheet as a recording medium; 17 a motor to rotate the magnetic sheet 16; 18 a motor servo circuit to stabilize the rotation of the motor; 19 a photometry element to measure the brightness of the object; and 20 a release switch. A series of photographing operations are started by turning on the release switch 20.

FIG. 2 shows a construction of the image pickup element 5 shown in FIG. 1.

In FIG. 2, reference numeral 501 denotes an interline transfer type solid-state image pickup element; 502 a photodiode for converting the light into the charges and accumulating; 503 a vertical CCD to vertically transfer the charges generated in the photodiode; and $V_1$ to $V_4$ transfer electrodes of the vertical CCD 503. The transfer electrode $V_1$ also functions as a transfer gate to transfer the charges of the odd-number rows of the photodiode. Similarly, the transfer electrode $V_3$ also functions as a transfer gate to transfer the charges of the even-number rows of the photodiode. The vertical CCD 503 is driven by transfer pulses of four phases. Reference numeral 504 denotes a horizontal CCD to horizontally transfer the charges which are transferred from the vertical CCD 503; and $H_1$ and $H_2$ indicate transfer electrodes of the horizontal CCD 504. The transfer electrodes $H_1$ and $H_2$ are driven by transfer pulses of two phases. Reference numeral 505 denotes an output amplifier for converting the charges into the voltage and generating; 506 a top drain to drain the unnecessary charges by the reverse transfer; and 507 a bottom drain to drain the unnecessary charges by the forward transfer.

FIG. 3 shows an operation sequence of the electronic still camera with the automatic focusing function. When the release switch 20 is turned on at a time $T_0$, a series of photographing sequence is started. The optimum iris value $A_v$ and the optimum shutter speed $T_v$ are calculated from the output of the photometry element 19. The iris is set into an open state for a period of time between $T_1$ and $T_2$. The lens unit 1 is moved by the lens driving motor 2 to the focusing position in a range from the infinite range to the shortest range in an n-stage step manner or continuously for a period of time between $T_2$ and $T_3$. A series of operations such as draining of unnecessary charges, exposure, and reading of the signal charges of n times, that is, the AF operation is executed. The blur amount is calculated from the output of the solid-state image pickup element 5 in the reading operations of the signal charges of n times, thereby calculating the position of the smallest blur amount, namely, the optimum focus position. The iris value is set to $A_v$ for a period of time between $T_3$ and $T_4$ and the lens unit 1 is set to the focused lens position. The clearing operation to drain the unnecessary charges to the top drain 506 by the reverse transfer is executed from a time $T_4$. After that, the regular exposure is performed. Subsequently, the signal charges are read out from a time $T_5$ and the processed signal is recorded onto the magnetic sheet 16.

FIG. 4 is a diagram for explaining one of the methods of detecting the ES value (edge spread value) indicative of the blur amount (hereinafter, referred to as an ES method). Since the ES value and the ES method have been disclosed in U.S. Pat. No. 4,804,831, they will be merely simply explained here. As shown in FIG. 4A, the edge of the video signal sharply rises in the focused state and slowly rises in the unfocused state. FIG. 4B shows an absolute value D of the differential waveform of the video signal. FIGS. 4C and 4D show delay signals $DL_1$ and $DL_2$ of the differential waveform D, respectively. FIG. 4E shows an integral waveform I and indicates a contrast of the edge portion of the video signal. FIG. 4F shows the ES value indicative of a sharpness of the edge which is obtained by dividing D by I.

FIG. 5, shows an example of a construction of the ES filter 9.

In FIG. 5, reference numeral 801 denotes a differential circuit; 802 an absolute value circuit; 803 a delay circuit; 804 an integral circuit; 805 a division circuit; 806 a peak-hold circuit. The value having the largest ES value in the image information is determined to be an ES value of the object.

FIG. 6 shows changes in lens position and ES value when the AF operation is executed in order to obtain the in-focus position.

The lens is continuously conveyed from the minimum position to the maximum position. During the lens conveyance, the image information is accumulated into the solid-state image pickup element 5 every vertical scan period (hereinafter, abbreviated to 1 V). The accumulated image signal is read out and the ES value is obtained from the read-out image information. The position of the largest ES value is determined to be the in-focus position. An axis of abscissa indicates a lens traveling amount. An axis of ordinate indicates a focusing signal (in this case, ES value). A curve in which the focusing position that is drawn in this instance is set to the peak point is called a mountain climbing curve. The mountain climbing curve according to the ES method is steep and a high focus detecting precision is obtained. In the above description, the AF operation is executed by using all of the image information which is supplied. However, since a high processing speed is required in the AF operation, a distance measurement frame having a predetermined area is ordinarily used and the AF operation is performed within the distance measurement frame.

However, since the area of the distance measurement frame is fixed to a predetermined value in the conventional AF operation, for instance, in the case where the distance measurement frame has a wide area as shown in FIG. 7A, for example, when both of a tree of a remote range and a man of a near range are simultaneously located in the distance measurement frame, a plurality of peaks exist in the ES value shown in the diagram. The AF operation is, therefore, unstable with respect to a point that the focal point is set to which one of the peak positions. On the contrary, in the case where the distance measurement frame has a narrow area as shown in FIG. 7B, in many cases, a high frequency component to find out the focal point is not included in the distance measurement frame. The ES value is small. In the worst case, there is a problem such that no peaks exists in the ES value and the accurate AF operation is not performed.

SUMMARY OF THE INVENTION

It is the first object of the invention to provide an electronic still camera which can solve the foregoing problems and can execute the accurate AF operation.

The second object of the invention is to provide an electronic camera in which an AF system using a video signal can be applied to an electronic still camera.

The third object of the invention is to provide an electronic camera which can always accurately set a focal point to an object without causing an erroneous operation such as perspective competition or the like irrespective of the state of an object.

To accomplish the above objects, according to a preferred embodiment of the invention, there is provided an electronic camera comprising: distance measurement frame setting means for changing an area of a distance measurement frame; arithmetic operating means for extracting a predetermined signal component in the distance measurement frame and for converting into a predetermined signal which is independent of a contrast; and a focus control means which is constructed in a manner such that an output level of the arithmetic operating means is compared with a reference level, when the output level is equal to or lower than the reference level, the distance measurement frame setting means is controlled so as to enlarge the area of the distance measurement frame at a predetermined ratio, and when the focusing signal level is higher than the reference level, the focusing operation is executed within the distance measurement frame.

According to another preferred embodiment of the invention, there is disclosed an electronic camera comprising: arithmetic operating means for calculating a value of a high frequency component which is independent of a contrast from the high frequency component and a luminance component in a distance measurement frame each time the distance measurement frame is moved to a plurality of predetermined positions in accordance with a predetermined order; comparing means for comparing the value calculated by the arithmetic operating means and a reference value; moving means for moving the distance measurement frame to the next predetermined position in the case where the calculated value is smaller than the reference value as a result of the comparison by the comparing means; and focusing means for executing a focusing operation in the distance measurement frame existing in the relevant position in the case where the calculated value is larger than the reference value as a result of the comparison by the comparing means.

Consequently, it is possible to realize an automatic focus adjusting apparatus in which the optimum distance measurement frame can be set irrespective of a state of an object and it is always stable and a high precision is obtained without causing an erroneous operation such as perspective competition or the like.

The above and other objects and features of the present invention will become apparent from the following detailed description and the appended claims with reference to the accompanying drawings.

BRIEF DESCRIPTION OF THE DRAWINGS

FIGS. 4A to 4F are diagrams for explaining an ES method;

DETAILED DESCRIPTION OF THE PREFERRED EMBODIMENTS

An embodiment of the invention will be described in detail hereinbelow with reference to the drawings.

Figure 1:
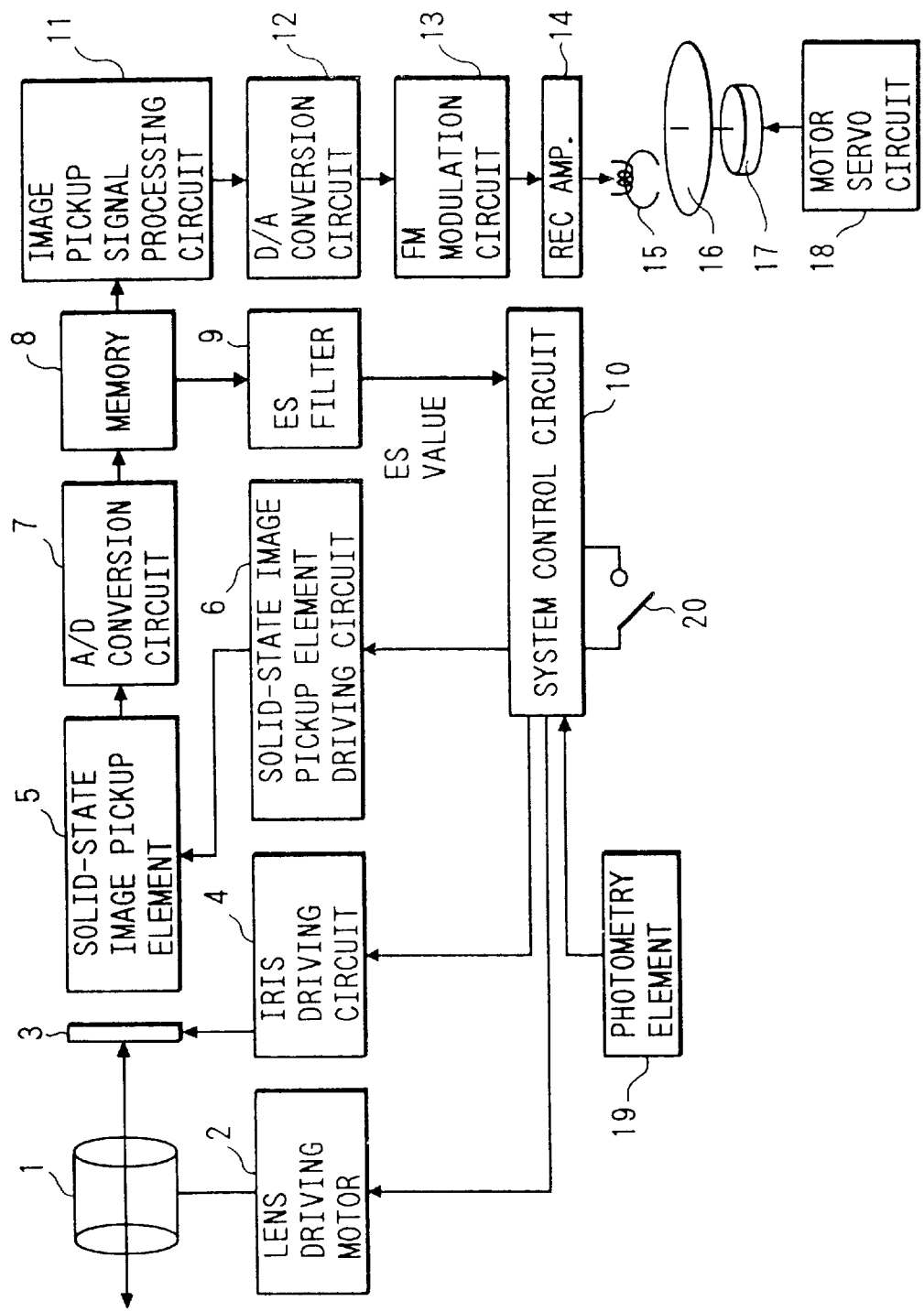
FIG. 1 is a block diagram showing an electronic still camera with an automatic focusing function.
Figure 2:
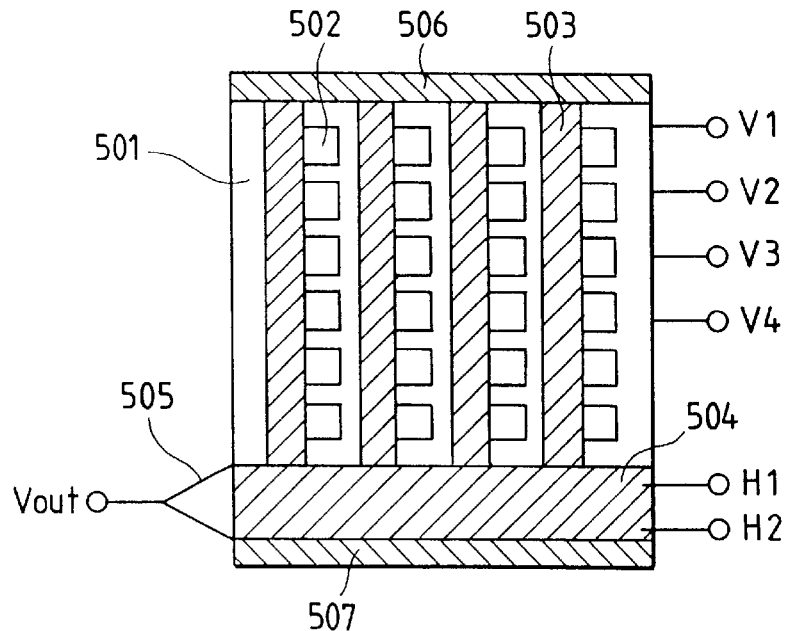
FIG. 2 is a diagram showing a construction of an interline transfer type solid-state image pickup element 5 shown in FIG. 1.
Figure 5:
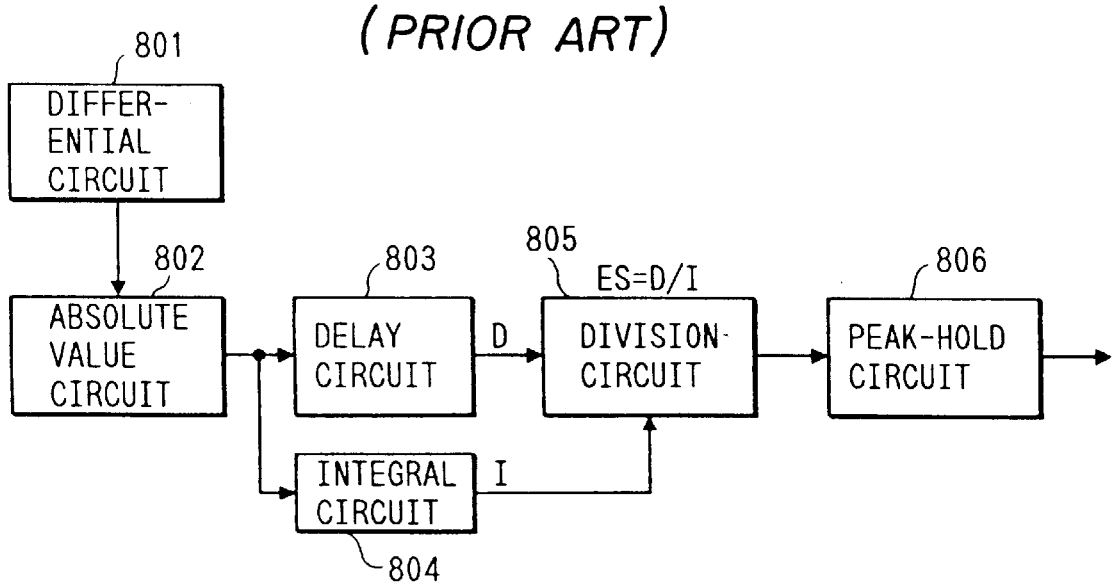
FIG. 5 is a block diagram showing a construction of an ES filter 9.
Figure 3:
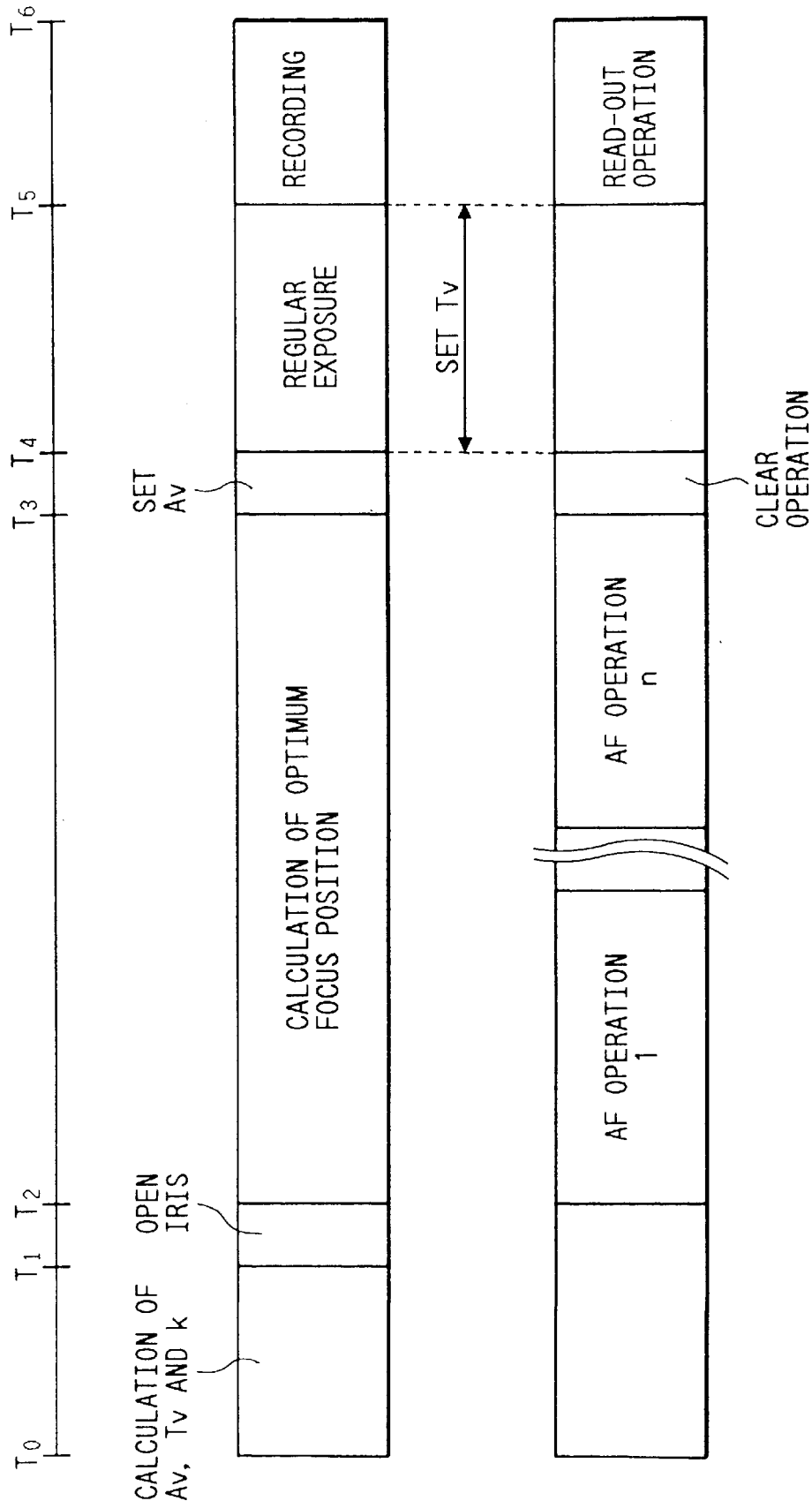
FIG. 3 is a diagram for explaining an operating sequence of the electronic still camera with the automatic focusing function.
Figure 6:
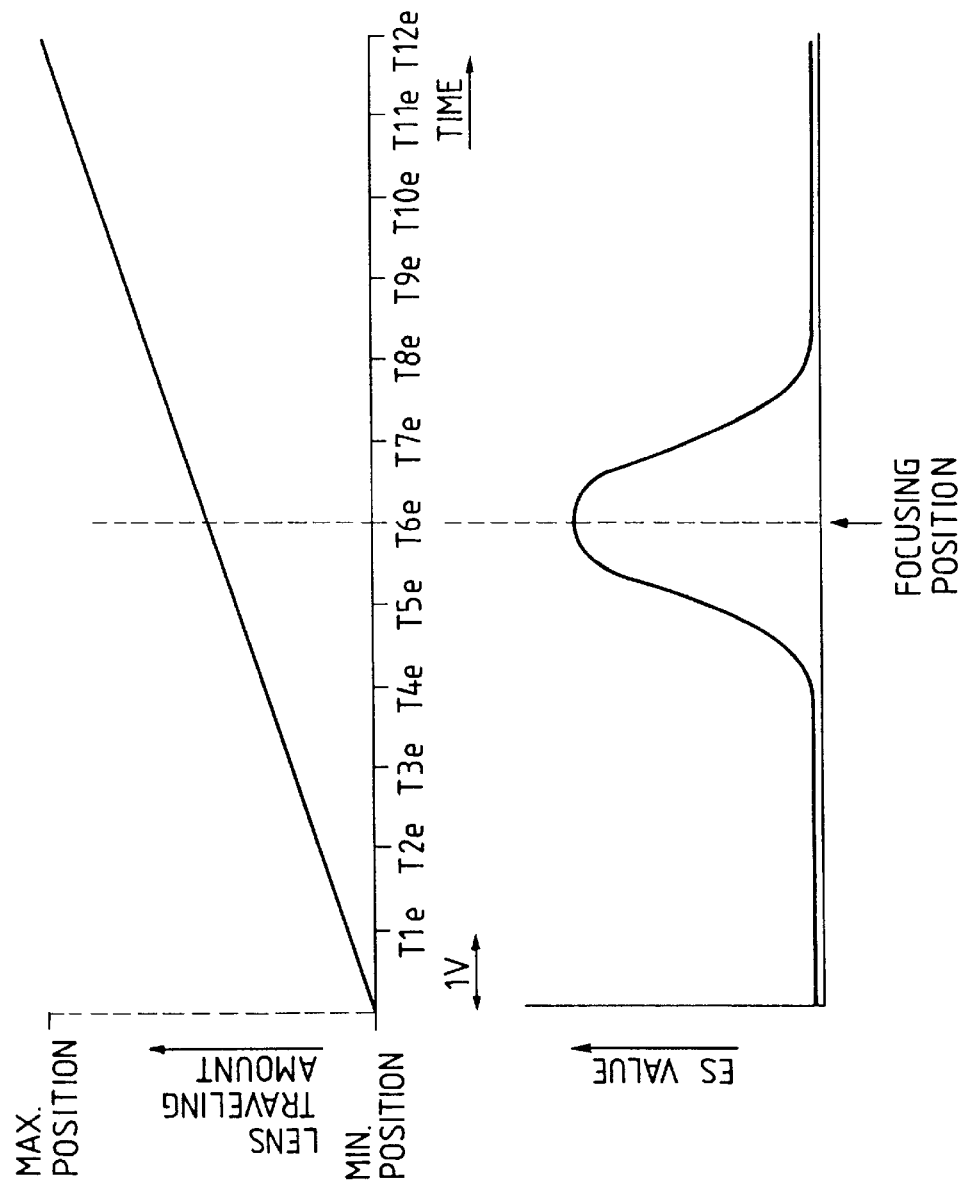
FIG. 6 is a diagram showing changes in the lens position and ES value for executing an AF operation.
Figure 7A:
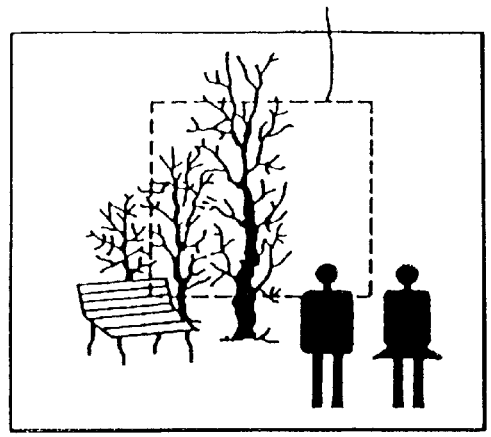
FIGS. 7A and 7B are diagrams showing distance measurement frames when a focusing position is obtained.
Figure 7B:
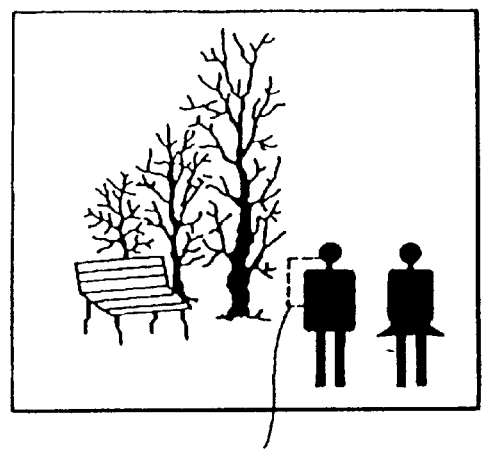
Figure 8:
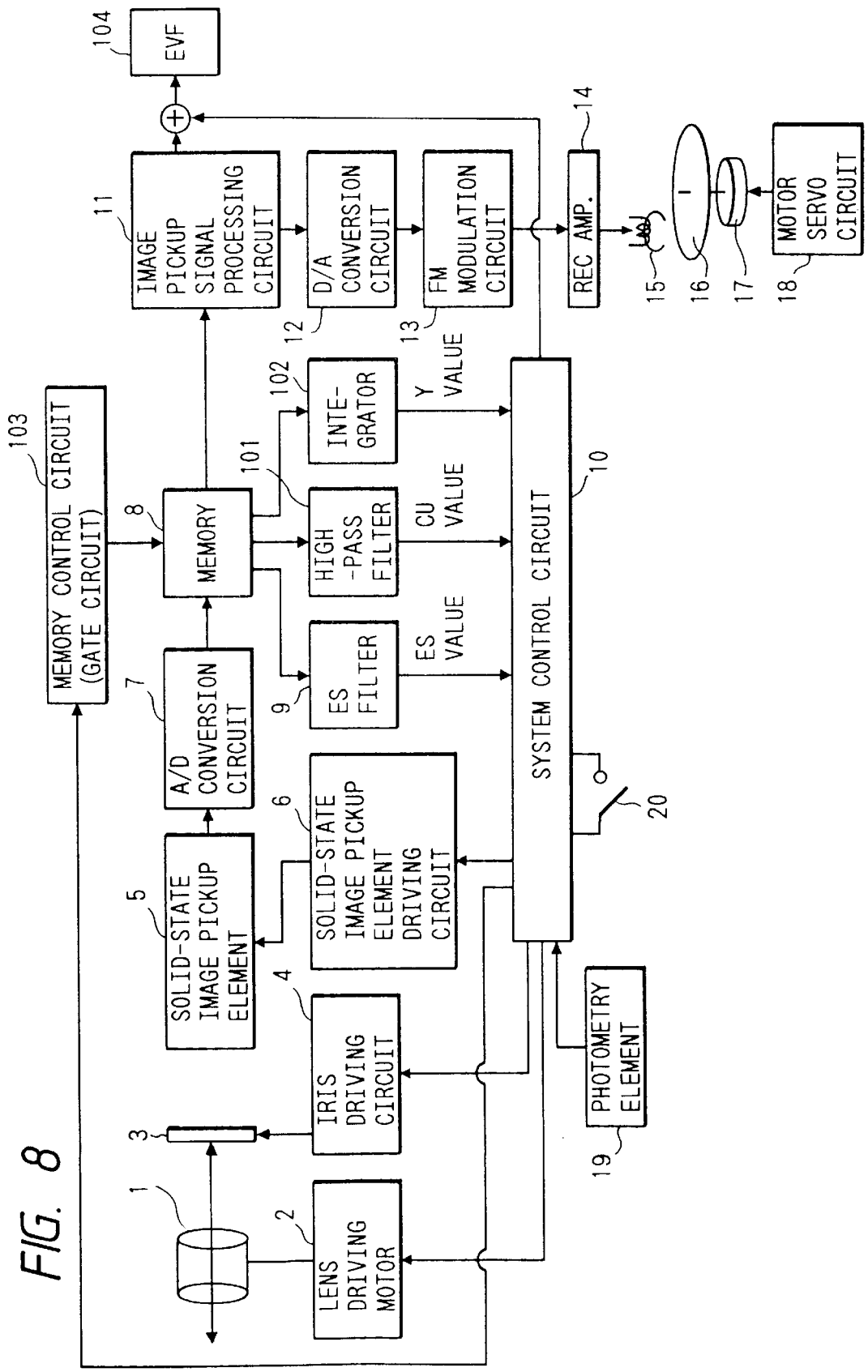
FIG. 8 is a block diagram showing an embodiment of the invention.

FIG. 8 shows an embodiment of the invention and relates to an example of an electronic still camera with an automatic focusing function. In FIG. 8, the same parts and components as those shown in FIG. 1 are designated by the same reference numerals and their descriptions are omitted here.

In the diagram, reference numeral 101 denotes a high-pass filter to detect a high frequency component of an image. The filter 101 has broad frequency characteristics in a movable range of a lens and a cut-off frequency is set to a low value such that an output value is not equal to 0 even in the unfocused state, particularly, in a large blur state. An output of the filter 101 is referred to as a CU value. Reference numeral 102 denotes an integrator to calculate a mean value of a luminance component of the image. An output of the integrator 102 is called a Y value.

Reference numeral 103 denotes a memory control circuit for making a reading range from the memory 8 variable on the basis of a command of the system control circuit 10 when the image pickup signal stored in the memory 8 is read out and supplied to the ES filter 9, high-pass filter 101, and integrator 102. That is, the memory control circuit 103 controls the reading range in the image pickup picture plane of the image pickup signal to be supplied to the ES filter 9, high-pass filter 101, and integrator 102. In brief, the memory control circuit 103 operates as a gate circuit to make a size and a position of the distance measurement frame variable. The image pickup signal which is read out from the memory 8 and supplied to the image pickup signal processing circuit 11 is read out by an amount of the whole picture plane. Reference numeral 104 denotes an electronic view finder to monitor the image which is generated from the processing circuit 11.

Display contents such as various control information, distance measurement frame, and the like are superimposed by a control signal from the system control circuit.

Figure 9:
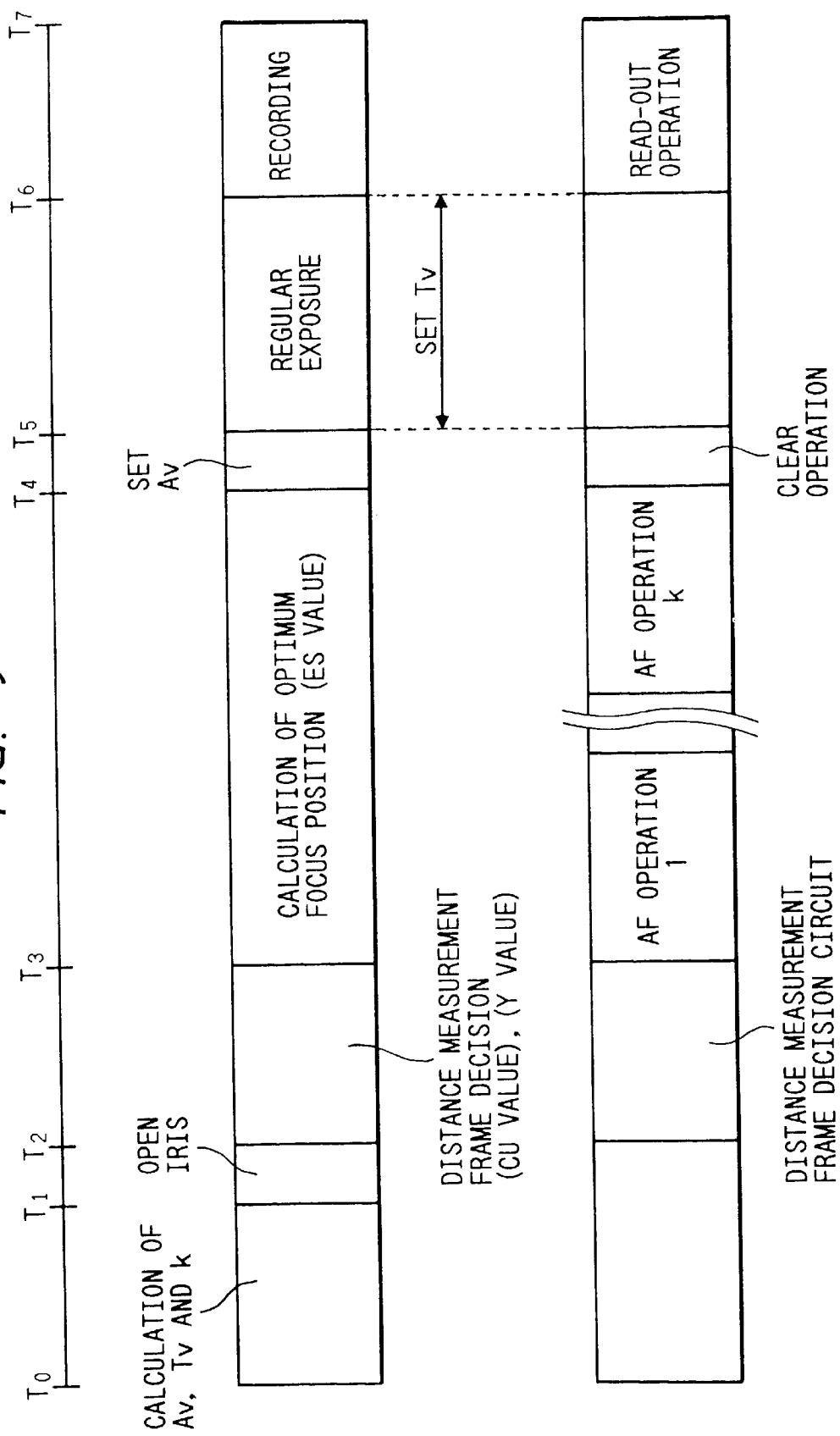
FIG. 9 is a diagram for explaining an operating sequence of an electronic still camera according to the embodiment.

The focusing operation will now be described with reference to FIGS. 9 and 10.

When the release switch 20 is turned on at the time $T_0$, a series of photographing sequence is started. The optimum iris value $A_v$ and the optimum shutter speed $T_v$ are calculated from the output of the photometry element 19. The iris is set to the open state for a period of time between the times $T_1$ and $T_2$ and the lens unit 1 is moved to the focus position near the center between the infinite range and the shortest range. The distance measurement frame of the minimum area which can be measured is set at the time $T_2$ and the first CU value and Y value are calculated.

Even in case of the same high frequency component, the amplitude characteristic of the CU value differs in dependence on the luminance level. Therefore, for instance, by dividing the CU value by the Y value in the system control circuit 10, the CU value can be normalized for the luminance, so that the high frequency component which is independent of the contrast can be extracted. The value of CU/Y is compared with an arbitrary reference value shown in FIG. 10. When the CU/Y value is smaller than the reference value as a result of the comparison, it is regarded that the distance measurement frame is small and no high frequency component exists. The memory control circuit 103 is controlled by the system control circuit 10 and the area of the distance measurement frame is set to a slightly wide frame at a predetermined or arbitrary ratio. The CU value and Y value are again calculated and processes similar to the above processes are repeated until the value of CU/Y exceeds the reference value.

Figure 10:
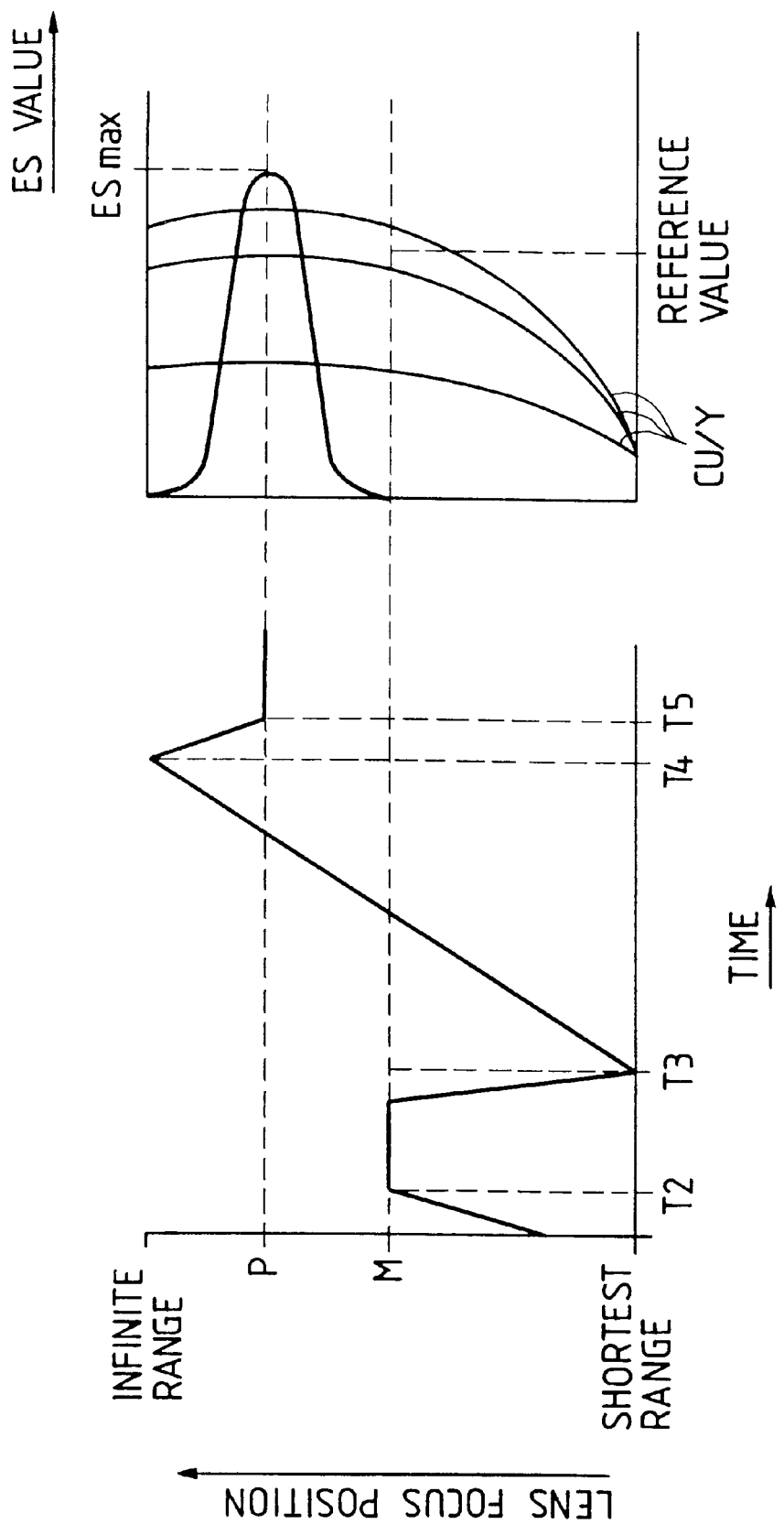
FIG. 10 is a diagram showing an example of changes in the lens position, CU value, CU/Y value, and ES value when the focusing position is obtained.

When the value of CU/Y first exceeds the reference value, the characteristics of the ES value in which only one kind of peak ($ES_{max}$) by the ES method exists are obtained as will be understood from FIG. 10. Therefore, the lens unit 1 is moved continuously or in a k-stage step manner to the lens position in a range from the shortest range to the infinite range at the time $T_3$. Together with the movement of the lens unit 1, a series of operations such as draining of the unnecessary charges, exposure, and reading of the signal charges, that is, the AF operation is executed. A blur amount is calculated through an ES filter from an output of the solid-state image pickup element 5 in the reading operation of the signal charges, thereby calculating the position of the smallest blur amount, that is, an in-focus lens position (P) on the basis of an ES signal. Since the peak characteristic of the ES value is set to one kind by adjusting the distance measurement frame before the AF operation as compared with the conventional method, the stable and accurate AF operation can be performed. Further, by displaying the distance measurement frame into the electronic view finder of the camera, the AF operation can be more accurately executed to the object to be focused. The iris value is set to $A_v$ for a period of time between the times $T_4$ and $T_5$ and the lens unit 1 is set to the in-focus lens position (P). The clearing operation to drain the unnecessary charges to the top drain 506 by the reverse transfer is executed from the time $T_4$–$T_5$. After that, the regular exposure is executed. The signal charges are subsequently read out from the time $T_6$ and the processed signal is recorded onto the magnetic sheet 16.

Figure 11:
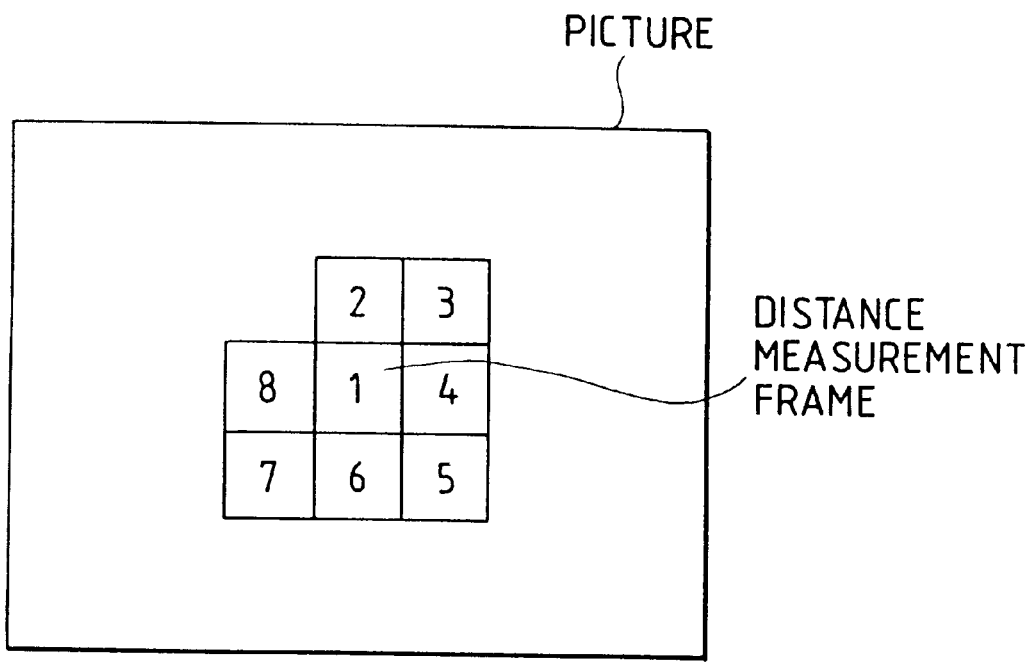
FIG. 11 is a diagram showing an example of the movement of the distance measurement frame.

A method of moving the distance measurement frame when a similar effect is obtained by moving the distance measurement frame instead of widening the distance measurement frame will now be described with reference to FIG. 11. The control itself can be performed by controlling the memory control circuit 103 by the system control circuit 10 and by variably changing the reading range from the memory.

First, the ratio of CU/Y is calculated with respect to the distance measurement frame (1). When the ratio is equal to or less than the reference value, the distance measurement frame is moved to the position (2) and operations similar to those mentioned above are executed. After that, the distance measurement frame is moved in accordance with the order of the reference numerals shown in FIG. 11 until the value of CU/Y is larger than the reference value. The AF operation based on the ES signal is executed by using the distance measurement frame at a time point when the value of CU/Y exceeds the reference value. In this case, since the size of distance measurement frame is small, a time which is required to calculate the ES value or the like is short and the high-speed AF operation can be realized.

In the embodiment, when the lens unit 1 is moved to the in-focus lens position (P) upon photographing, it is directly moved from the AF operation end position. However, it is also possible to temporarily move the lens unit 1 to the AF operation start position after completion of the AF operation and to subsequently move the lens unit to the P point from the same direction as that in the AF operation.

The filter to detect the blur amount is not limited to the ES filter but, for instance, a high-pass filter or a band-pass filter can be also used.

A band-pass filter can be also used as a filter 101 to detect the high frequency component.

Further, although the embodiment has been described with respect to the example in which the focus detecting means is constructed by the digital filter, the focus detecting means can be also realized in an analog manner.

The whole photographing sequence will now be described.

Figure 12:
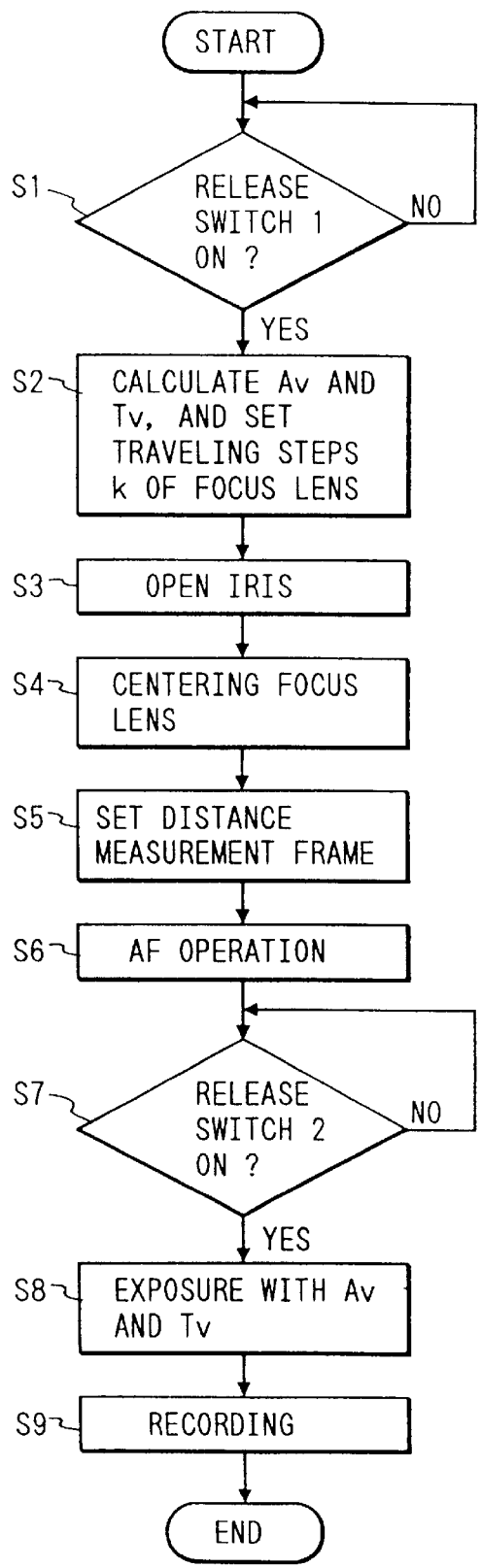
FIG. 12 is a flowchart showing a photographing sequence of the whole electronic camera of the invention.

FIG. 12 is a flowchart showing the photographing sequence of the electronic camera in the invention. When the control is started, a check is made in step S1 to see if the shutter release switch has been turned on or not. The shutter release switch is constructed by strokes of two stages. The switch (1) is closed by the depression of the first stage and the switch (2) is closed by the depression of the second stage. In step S1, a check is made to see if the first stage has been depressed or not, namely, to see if the switch (1) has been turned on or not.

When the switch (1) is turned on in step S1, step S2 follows and a photometry operation is executed and the iris value $A_v$, the shutter speed $T_v$, and further a unit driving step number k of a focusing lens when performing the automatic focus adjusting operation are set. In step S3, the iris is opened. After that, in step S4, the focusing lens is moved to a position almost near the center between the shortest range and the infinite range. In step S5, the distance measurement frame setting operation is executed. The distance measurement frame setting operation is as mentioned above. The operation to change the size or position of the distance measurement frame is executed so that the signal level in which the high frequency component in the image pickup signal has been normalized by the mean value of the luminance signal is equal to or higher than the reference level.

After completion of the distance measurement frame setting operation, in step S6, the focusing lens is actually driven on a k-step unit basis which has been set in step S2. The position corresponding to the maximum ES value is set to the in-focus point and the focusing lens is stopped here. At this time point, the photographing preparing operation is completed and a state in which the photographing operation can be performed is obtained.

In step S7, a check is made to see if the second stage of the release switch has been depressed or not, namely, to see if the switch (2) has been turned on or not. When the switch (2) is turned on, step S8 follows and the actual exposure is executed on the basis of the iris value $A_v$ and the shutter speed $T_v$ which have been set in step S2. The image signal is recorded onto the recording medium in step S9.

A series of photographing operations are completed as mentioned above.

As described above, according to the invention, since the electronic camera apparatus has been constructed as mentioned above, the stable and accurate focus information without an erroneous operation can be obtained.

What is claimed is:

1. An electronic camera comprising:
    a) focus detecting frame setting means for setting a focus detecting frame into an image sensing plane so that its size can be changed;
    b) focus detecting frame size setting means for setting a size of the focus detecting frame on the basis of a first signal component regarding a high frequency component extracted from an image pickup signal corresponding to the inside of the focus detecting frame; and
    c) focus detecting means for detecting a focusing state on the basis of a second signal component regarding an edge component extracted from the image pickup signal corresponding to the inside of the focus detecting frame set by the focus detecting frame size setting means and for executing a focus adjustment on the basis of said focusing state.

2. A camera according to claim 1, wherein in a state in which the size of the focus detecting frame is set to the minimum value, said focus detecting frame size setting means compares a level of the first signal component and a reference level and enlarges an area of the focus detecting frame at a predetermined ratio when said first signal component level is equal to or lower than said reference level.

3. A camera according to claim 2, wherein said first signal component is a high frequency component in the image pickup signal and said focus detecting frame size setting means includes signal processing means for normalizing the high frequency component on the basis of a luminance signal level and converting into a signal which is independent of a contrast.

4. A camera according to claim 1, further having:
    recording means for recording the image pickup signal onto a recording medium.

5. An electronic camera comprising:
    a) focus detecting frame setting means for setting a focus detecting frame into an image sensing plane so that its position can be changed;
    b) focus detecting frame position setting means for setting a position of the focus detecting frame on the basis of a first signal component regarding a high frequency component extracted from an image pickup signal corresponding to the inside of the focus detecting frame; and
    c) focus detecting means for detecting a focusing state on the basis of a second signal component frequency characteristic different from that of the first signal regarding an edge component extracted from the image pickup signal corresponding to the inside of the focus detecting frame which has been set by the focus detecting frame position setting means and for executing a focus adjustment on the basis of said focusing state.

6. A camera according to claim 5, wherein in a state in which a position of the focus detecting frame is set to the center of the image sensing plane, said focus detecting frame position setting means compares a level of the first signal component and a reference level and changes the position of the focus detecting frame by a predetermined algorithm until said first signal component level exceeds the reference level when the first signal component level is equal to or lower than said reference level.

7. A camera according to claim 6, wherein said focus detecting frame setting means executes the focus detecting frame setting operation in a state in which a focusing lens for the focus adjustment has been located almost near the center of a moving range.

8. A camera according to claim 6, wherein said first signal component is a high frequency component in the image pickup signal and said distance measurement frame position setting means includes signal processing means for normalizing the high frequency component by a luminance signal level and for converting into the signal which is independent of a contrast.

9. A camera according to claim 5, further having:
    recording means for recording the image pickup signal onto a recording medium.

* * * * *

UNITED STATES PATENT AND TRADEMARK OFFICE
CERTIFICATE OF CORRECTION

PATENT NO. : 6,037,980
DATED : March 14, 2000
INVENTOR(S) : Nobuhiro Takeda

It is certified that error appears in the above-identified patent and that said Letters Patent are hereby corrected as shown below:

Col. 8, lines 27-28, delete "frequency characteristic different from that of the first signal".

Signed and Sealed this

Seventeenth Day of April, 2001

Attest:

NICHOLAS P. GODICI

*Attesting Officer*  *Acting Director of the United States Patent and Trademark Office*